United States Patent
Komai et al.

(10) Patent No.: US 8,217,598 B2
(45) Date of Patent: Jul. 10, 2012

(54) METHOD OF DRIVING VIBRATION WAVE MOTOR AND DEVICE FOR DRIVING THE SAME

(75) Inventors: Toshihisa Komai, Hirosaki (JP); Makoto Shiomi, Yokohama (JP)

(73) Assignees: Canon Kabushiki Kaisha, Tokyo (JP); Canon Precision Inc., Hirosaki-shi (JP)

( * ) Notice: Subject to any disclaimer, the term of this patent is extended or adjusted under 35 U.S.C. 154(b) by 299 days.

(21) Appl. No.: 12/710,043

(22) Filed: Feb. 22, 2010

(65) Prior Publication Data
US 2010/0219778 A1    Sep. 2, 2010

(30) Foreign Application Priority Data
Feb. 27, 2009    (JP) .................................. 2009-046268

(51) Int. Cl.
*H02N 2/14* (2006.01)
(52) U.S. Cl. ........ 318/116; 318/255; 318/256; 318/257; 318/258
(58) Field of Classification Search .................. 318/116, 318/255, 256, 257, 258
See application file for complete search history.

(56) References Cited

U.S. PATENT DOCUMENTS

| | | | |
|---|---|---|---|
| 5,644,199 A * | 7/1997 | Nojima et al. | 318/114 |
| 6,100,622 A * | 8/2000 | Yamamoto et al. | 310/316.01 |
| 6,724,607 B2 | 4/2004 | Hayashi et al. | |
| 6,987,345 B2 * | 1/2006 | Yamamoto | 310/316.01 |

FOREIGN PATENT DOCUMENTS

| | | |
|---|---|---|
| JP | 2001157473 | 6/2001 |
| JP | 2002176788 | 6/2002 |

* cited by examiner

*Primary Examiner* — Walter Benson
*Assistant Examiner* — David Luo
(74) *Attorney, Agent, or Firm* — Fitzpatrick, Cella, Harper & Scinto

(57) ABSTRACT

A method of driving a vibration wave motor enables proper frequency control of an AC voltage applied to the motor according to the rotational speed difference between the actual and target rotational speeds of the motor, even if frequency-rotational speed characteristics are not stored in advance. A target rotational speed of a moving member is set. A ratio of an amount of increase or decrease in a rotational speed of the moving member to an amount of update of a frequency of the AC voltage and a rotational speed difference between the target rotational speed and an actual rotational speed of the moving member are calculated. The amount of update of the frequency is calculated by dividing the calculated rotational speed difference by the calculated ratio. The frequency of the AC voltage is updated by using the calculated amount of update of the frequency.

4 Claims, 8 Drawing Sheets

RELATED ART

METHOD OF DRIVING VIBRATION WAVE MOTOR AND DEVICE FOR DRIVING THE SAME

BACKGROUND OF THE INVENTION

1. Field of the Invention

The present invention relates to control of a vibration wave motor that causes an electromechanical energy conversion element to generate progressive vibrations in a vibrating member to thereby cause relative motion between the vibrating member and a moving member in contact with the vibrating member.

2. Description of the Related Art

A so-called vibration wave motor causes an electromechanical energy conversion element to generate vibrations in an elastic member to thereby actuate a moving member (rotary member) in contact with the elastic member. The vibration wave motor is used as an actuator which is capable of taking out a large actuating force (torque) at low speed.

For example, a so-called progressive wave-type vibration wave motor causes the elastic member to generate a progressive vibration wave by excitation, and continuously actuates the moving member in pressure contact with the elastic member. Such a vibration wave motor is capable of smoothly actuating the moving member (see e.g. Japanese Patent Laid-Open publication No. 2001-157473).

The vibrating member used in the vibration wave motor disclosed in Japanese Patent Laid-Open publication No. 2001-157473 is formed by an annular elastic member. A group of projections each having a comb-tooth shape is formed on one end face of the elastic member in an axial direction thereof, and a friction material is secured to a top surface of each projection of the group using an adhesive or the like. Further, an annular piezoelectric element as the electromechanical energy conversion element is secured to the other end face of the elastic member in the axial direction thereof using an adhesive or the like, and the piezoelectric element is formed with a pattern electrode.

The pattern electrode formed on the piezoelectric element is equally divided, according to the order of vibration modes to be excited in an annular portion of the vibrating member, into a number of electrodes which is four times as large as the order of vibration modes. AC voltages each having a substantially sinusoidal wave shape and displaced in time phase by 90 degrees from each other are sequentially applied to the electrodes.

When the AC voltage is applied to each electrode at a frequency near the natural frequency of the excited vibration mode, the elastic member is caused to resonate by a bending moment applied thereto by the expansion and contraction of the piezoelectric element. Vibrations (vibration modes) excited by the AC voltages displaced in time phase by 90 degrees from each other are identical in wave shape but different in phase, so that a progressive vibration wave (progressive wave) is generated by synthesizing the vibrations.

Figure 7:
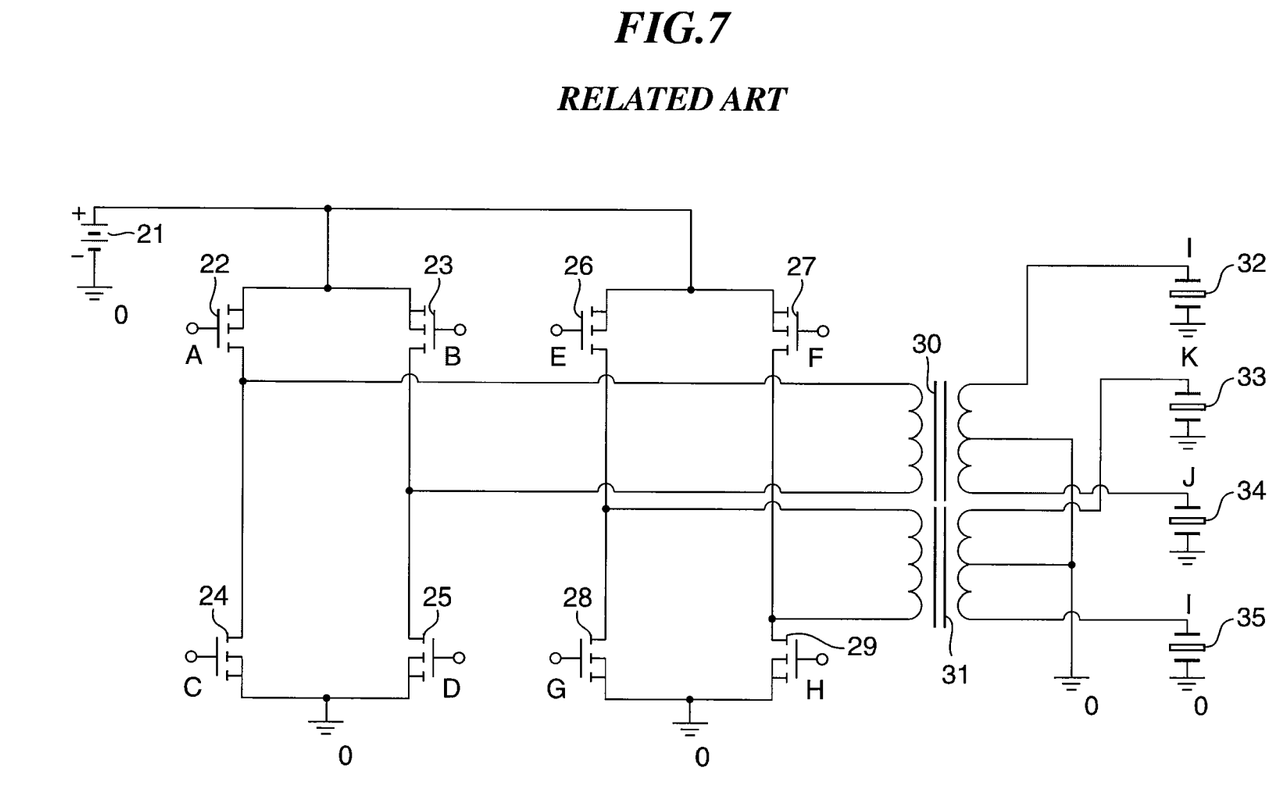
FIG. 7 is a schematic diagram of a drive circuit for driving the vibration wave motor.

There have been proposed various drive circuits for driving the above-described progressive wave-type vibration wave motor (see e.g. Japanese Patent Laid-Open publication No. 2002-176788). FIG. 7 is a schematic diagram of a drive circuit for driving the vibration wave motor, which is disclosed in Japanese Patent Laid-Open publication No. 2002-176788. In this drive circuit, a switching circuit formed by MOSFETs (Metal Oxide Semiconductor Field Effect Transistors) 22 to 29 is on/off controlled by pulses generated by a pulse generating circuit, not shown, whereby an AC voltage is generated in center-tapped transformers 30 and 31. This sequentially applies the AC voltages displaced in time phase by 90 degrees from each other to terminals 32 to 35 connected to the secondary side which correspond to A(+) phase, B(+) phase, A(−) phase and B(−) phase, respectively.

Figure 8:
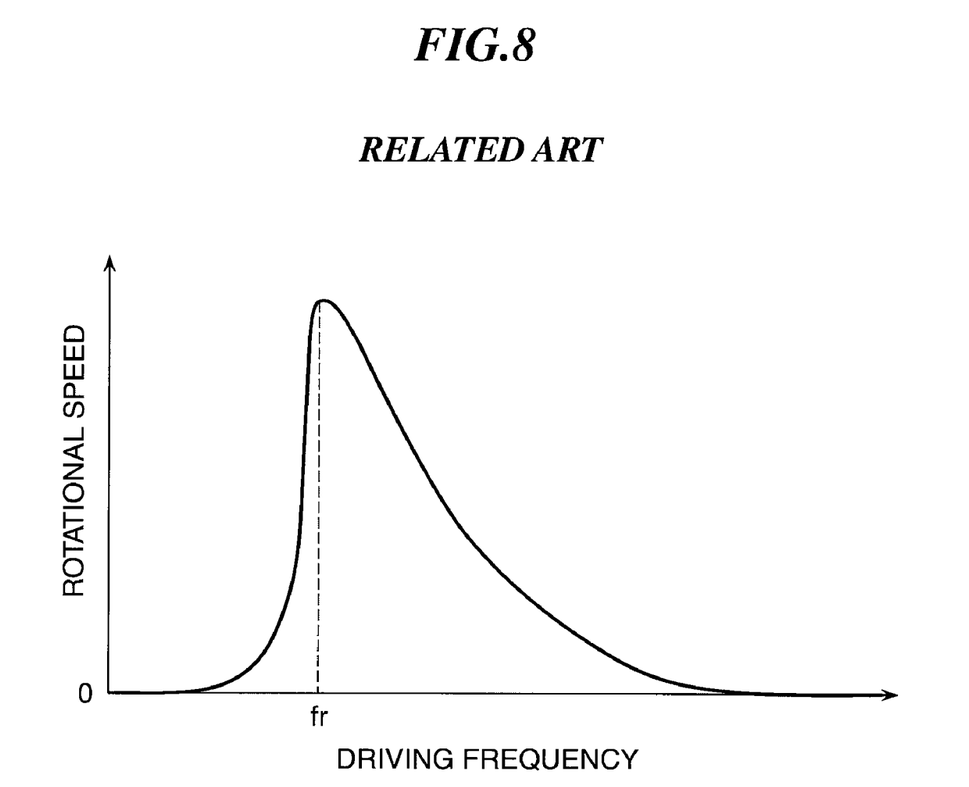
FIG. 8 is a characteristic diagram showing the relationship between the frequency of an AC voltage and the rotational speed of the vibration wave motor.

In general, the speed control of the vibration wave motor by the drive circuit configured as above is performed by controlling the frequency of the AC voltage as an input signal. FIG. 8 is a characteristic diagram showing the relationship between the frequency of the AC voltage and the rotational speed of the vibration wave motor. In FIG. 8, the horizontal axis represents the frequency of the AC voltage, which becomes higher toward the right as viewed in the figure, and the vertical axis represents the rotational speed (actuation speed) of the vibration wave motor, which becomes higher upward as viewed in the figure.

In general, the vibration wave motor is driven as follows: First, the frequency of the AC voltage is set to a value sufficiently higher than a resonance frequency $f_r$ of the vibration wave motor and then the vibration wave motor is started. Then, the frequency of the AC voltage is progressively made closer to the resonance frequency $f_r$ (the frequency is made lower), to thereby accelerate the vibration wave motor, whereafter the frequency is progressively made away from the resonance frequency (the frequency is made higher), to thereby decelerate the vibration wave motor. Here, in accelerating the vibration wave motor, if the frequency of the AC voltage becomes lower than the resonance frequency $f_r$, the rotational speed of the vibration wave motor suddenly drops. Therefore, the frequency of the AC voltage is set to a range within which it is not lower than the resonance frequency $f_r$.

However, as can be understood from FIG. 8, the frequency of the AC voltage applied to the vibration wave motor and the rotational speed of the vibration wave motor are in a nonlinear relationship. Further, frequency-rotational speed characteristics shown in FIG. 8 vary not only depending on differences between individual vibration wave motors of the same model but also by a variation in load applied to the vibration wave motor and a change in the temperature of the vibration wave motor. For this reason, even when the difference between an actual rotational speed of the vibration wave motor at a certain time point and a target rotational speed thereof at the same time point (hereinafter referred to as "the rotational speed difference") is calculated, it is difficult to unconditionally determine a frequency to be set, based on the rotational speed difference.

SUMMARY OF THE INVENTION

The present invention provides a method of driving a vibration wave motor, which makes it possible to properly control the frequency of an AC voltage applied to the vibration wave motor according to the rotational speed difference between the actual rotational speed of the vibration wave motor and the target rotational speed thereof even if frequency-rotational speed characteristics are not stored in advance. Further, the present invention provides a drive device for carrying out the method of driving the vibration wave motor.

In a first aspect of the present invention, there is provided a method of driving a vibration wave motor that drives a moving member in contact with a vibrating member by applying an AC voltage to an electromechanical energy conversion element affixed to the vibrating member and thereby causing the vibrating member to vibrate, comprising setting a target rotational speed of the moving member, calculating a ratio of an amount of increase or decrease in a rotational speed of the moving member to an amount of update of a frequency of the AC voltage, calculating a rotational speed difference between the target rotational speed and an actual rotational speed of the moving member, calculating the amount of update of the frequency by dividing the calculated rotational speed difference by the calculated ratio, and updating the frequency of the AC voltage by using the calculated amount of update of the frequency.

In a second aspect of the present invention, there is provided a drive device for driving a vibration wave motor that drives a moving member in contact with a vibrating member by applying an AC voltage to an electromechanical energy conversion element affixed to the vibrating member and thereby causing the vibrating member to vibrate, comprising a drive control circuit that sets a target rotational speed of the moving member, calculates a ratio of an amount of increase or decrease in a rotational speed of the moving member to an amount of update of a frequency of the AC voltage, calculates a rotational speed difference between the target rotational speed and an actual rotational speed of the moving member, calculates the amount of update of the frequency by dividing the calculated rotational speed difference by the calculated ratio, and updates the frequency of the AC voltage by using the calculated amount of update of the frequency.

With the configuration of the method of driving the vibration wave motor according to the first aspect of the present invention and with the configuration of the drive device for the vibration wave motor according to the second aspect of the present invention, it is possible to properly control the frequency of the AC voltage applied to the vibration wave motor according to the rotational speed difference between the actual rotational speed of the vibration wave motor and the target rotational speed thereof. In doing this, there is no need to store in advance the frequency-rotational speed characteristics of the vibration wave motor on a vibration wave motor-by-vibration wave motor basis, so it is possible to simplify the configuration of the drive device.

Further features of the present invention will become apparent from the following description of exemplary embodiments with reference to the attached drawings.

DETAILED DESCRIPTION OF THE EMBODIMENTS

The present invention will now be described in detail below with reference to the accompanying drawings showing embodiments thereof.

Figure 1:
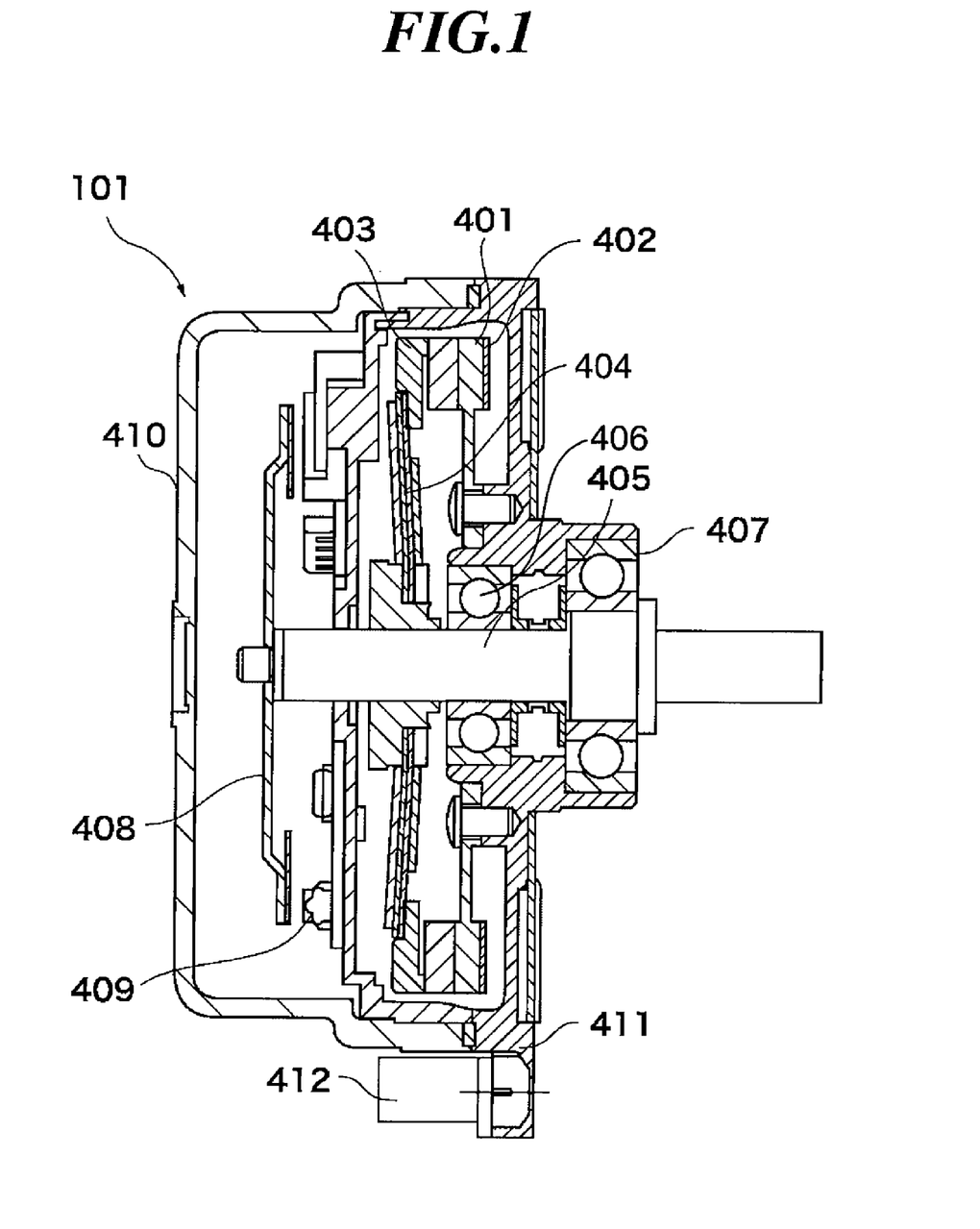
FIG. 1 is a schematic cross-sectional view of a vibration wave motor used in an embodiment of the present invention.

FIG. 1 is a schematic cross-sectional view of a vibration wave motor to which is applied a method of driving the vibration wave motor according to the present invention and drive control performed by a drive device for driving the vibration wave motor.

The vibration wave motor 101 is comprised of a vibrating member (elastic member) 401, a piezoelectric element 402, a moving member (rotary member) 403, a pressing spring 404, a shaft 405 and bearings 406 and 407.

The vibrating member 401 is made of metal and is manufactured by a sintering method or the like. The piezoelectric element 402 is an electromechanical energy conversion element for causing the vibrating member 401 to vibrate by excitation and is secured to one end face of the vibrating member 401 e.g. by an adhesive. Hereinafter, a unit formed by securing the vibrating member 401 and the piezoelectric element 402 to each other will be referred to as "the stator".

Figure 2A:
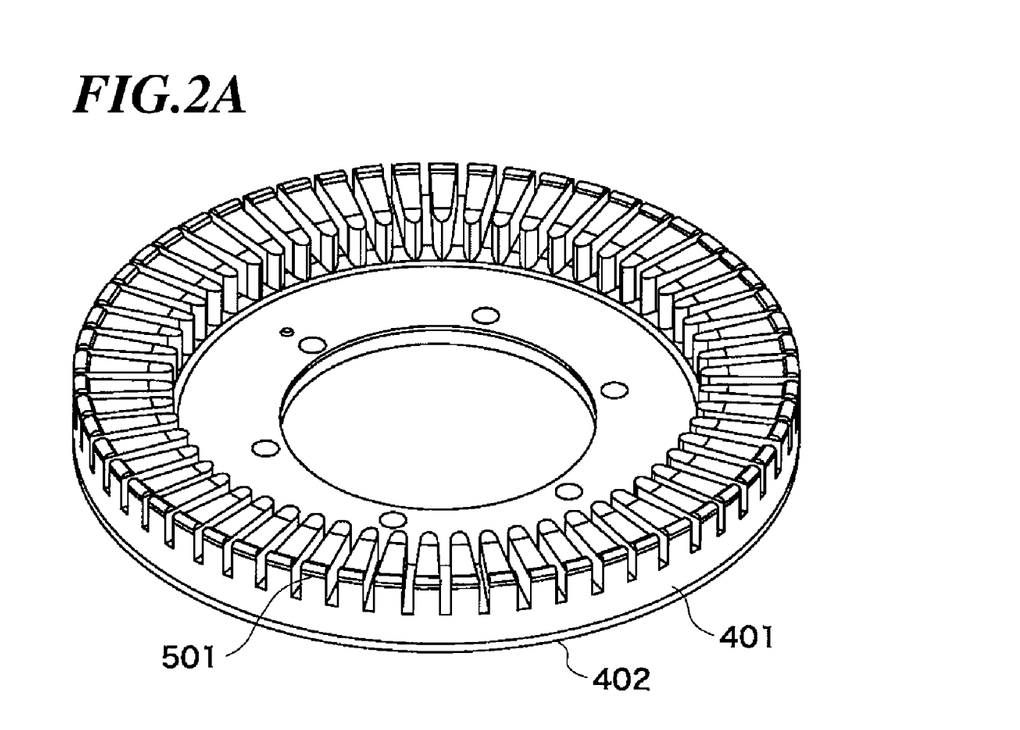
FIG. 2A is a schematic perspective view of a stator as a component of the vibration wave motor shown in FIG. 1, as viewed from a moving member side.
Figure 2B:
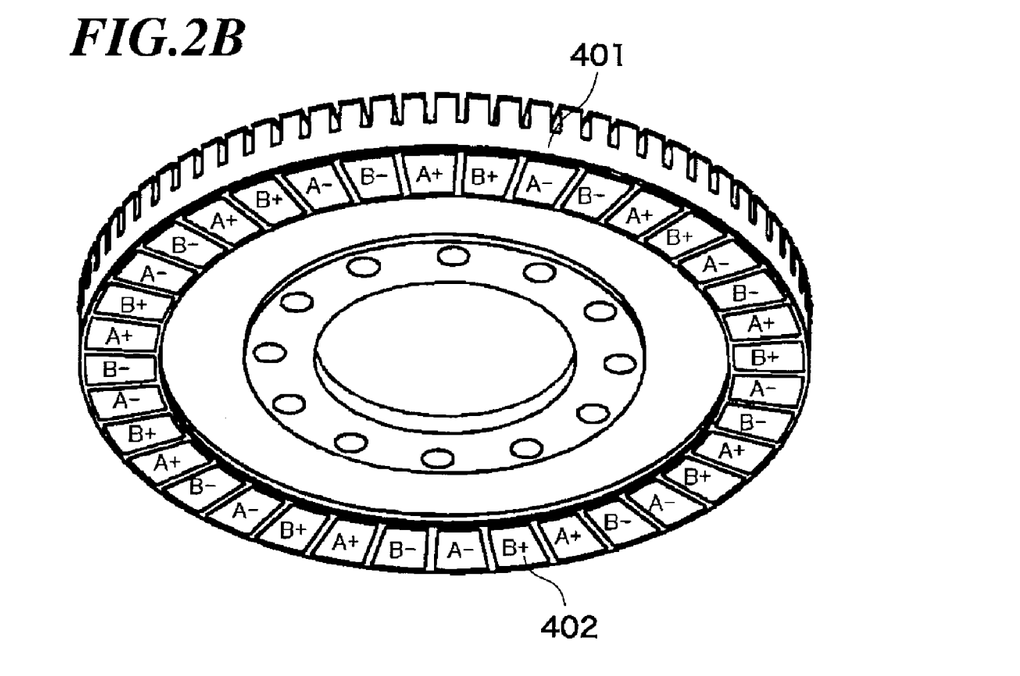
FIG. 2B is a schematic perspective view of the stator as the component of the vibration wave motor shown in FIG. 1, as viewed from a piezoelectric element side.

FIGS. 2A and 2B are perspective views of the stator, in which FIG. 2A is a view of the stator as viewed from the moving member side, and FIG. 2B is a view of the stator as viewed from the piezoelectric element side. Referring to FIG. 2A, the one end face of the vibrating member 401 toward the moving member 403 has a comb-teeth shape, and a friction material 501 which is excellent in wear resistance to friction against the moving member 403 is affixed to a top surface of the vibrating member 401 e.g. by an adhesive. The friction material 501 makes it possible to suppress abrasion of the stator to prolong the service life of the vibration wave motor 101.

As shown in FIG. 2B, the piezoelectric element 402 has a structure configured such that a plurality of (e.g. 36) electrodes are formed on respective divided areas of a surface of a base body of an annular piezoelectric member made of piezoelectric ceramics. These electrodes can be formed e.g. by a vapor deposition method. The piezoelectric member forming the piezoelectric element 402 is polarized in all the areas thereof to the same polarity in respect of the direction of thickness thereof before being affixed to the vibrating member 401 e.g. by an adhesive. Symbols "A+", "B+", "A−" and "B−" added to the respective electrodes in FIG. 2B denote the kinds of AC voltages (drive voltages) applied during driving the vibration wave motor 101, and the AC voltages are externally applied to the respective "A+", "B+", "A−" and "B−".

The moving member 403 is an annular metal member, and is pressed against the vibrating member 401 by the pressing spring 404 with a predetermined force to be brought into contact with the friction material 501. When a four-phase AC voltage (AC voltages displaced in time phase by 90 degrees from each other) is applied to the piezoelectric element 402, a progressive vibration wave is generated in the vibrating member 401, whereby the moving member 403 pressed against the vibrating member 401 is caused to perform rotation by frictional forces.

The shaft 405, which serves as an output shaft of the rotation of the moving member 403, is rotatably supported by the two bearings 406 and 407 and is connected to the moving member 403 by the pressing spring 404. Therefore, when the moving member 403 performs a rotation, the shaft 405 as well performs a rotation. A driven member (not shown) is mounted on the shaft 405.

The vibration wave motor 101 is further comprised of a code wheel 408 and an encoder element 409. The code wheel 408 is a member used for detecting the rotational speed or the rotational position of the shaft 405, and is secured to the shaft 405 for rotation with the shaft 405. On a surface of the code wheel 408, opposed to the encoder element 409, reflective surfaces (not shown) and non-reflective surfaces (not shown) are alternately and circumferentially formed into a predetermined pattern.

The encoder element 409 includes a light emitting section and a light receiving section, and emits light onto the pattern formed on the code wheel 408, for receiving reflected light from the pattern. The encoder element 409 further includes an IC (Integrated Circuit) for converting the reflected light into a pulse signal and outputting the pulse signal. A time interval and a time period at which the reflected light is received vary with the rotational speed and the pattern of the code wheel 408, and a pulse signal is obtained which varies according to the time interval and the time period. Therefore, it is possible to detect the rotational speed and the rotational position of the shaft 405 based on the pulse signal. The function for converting the reflected light into the pulse signal is not necessarily required to be provided in the encoder element 409. This function may be provided in a pulse counter circuit 105 (see FIG. 4), described hereinafter.

The vibration wave motor 101 further includes a motor cover 410, a housing 411 and a connector 412. The housing 411 plays the role of supporting the stator, the shaft 405 and the like, and the motor cover 410 plays the role of protecting the component parts constituting the vibration wave motor 101.

The connector 412 connects a drive circuit, referred to hereinafter, to the vibration wave motor 101. Via the connector 412, the AC voltage is applied to the piezoelectric element 402, electric power is supplied to the encoder element 409, and the output signal (pulse signal) is taken out from the encoder element 409.

Figure 6:
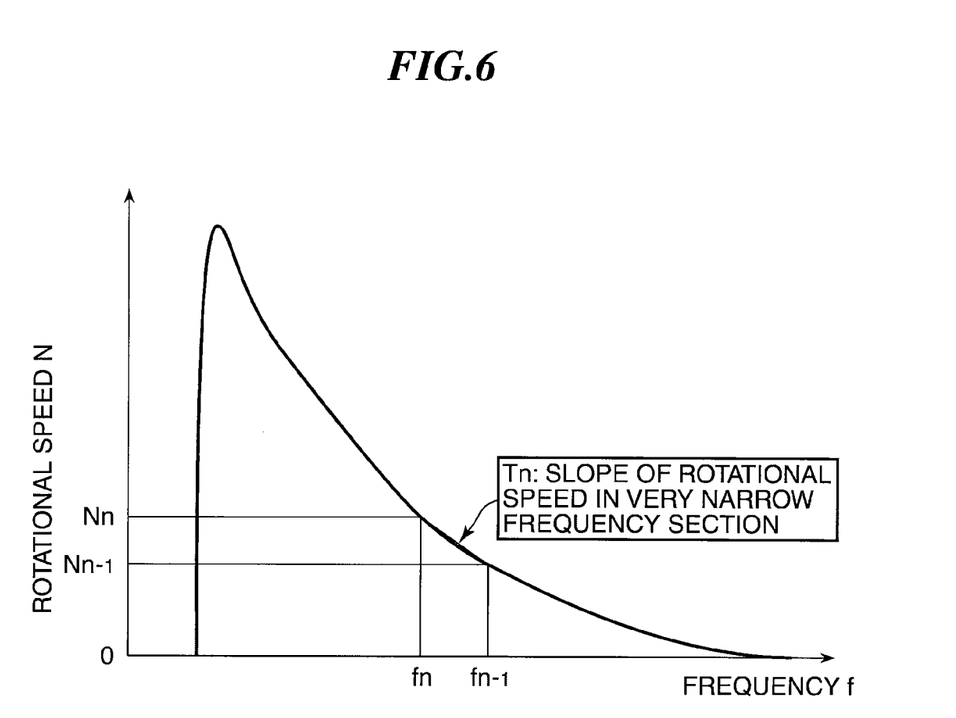
FIG. 6 is a schematic diagram of a proportion of the amount of increase or decrease in the rotational speed of the vibration wave motor with respect to an amount of update in a frequency command signal for driving the vibration wave motor, in the speed control process shown in FIG. 5.

The frequency-rotational speed characteristics of the vibration wave motor 101 configured as above are as shown in FIG. 6, referred to hereinafter, and are the same as characteristics described hereinabove in Description of the Related Art with reference to FIG. 8.

Figure 3:
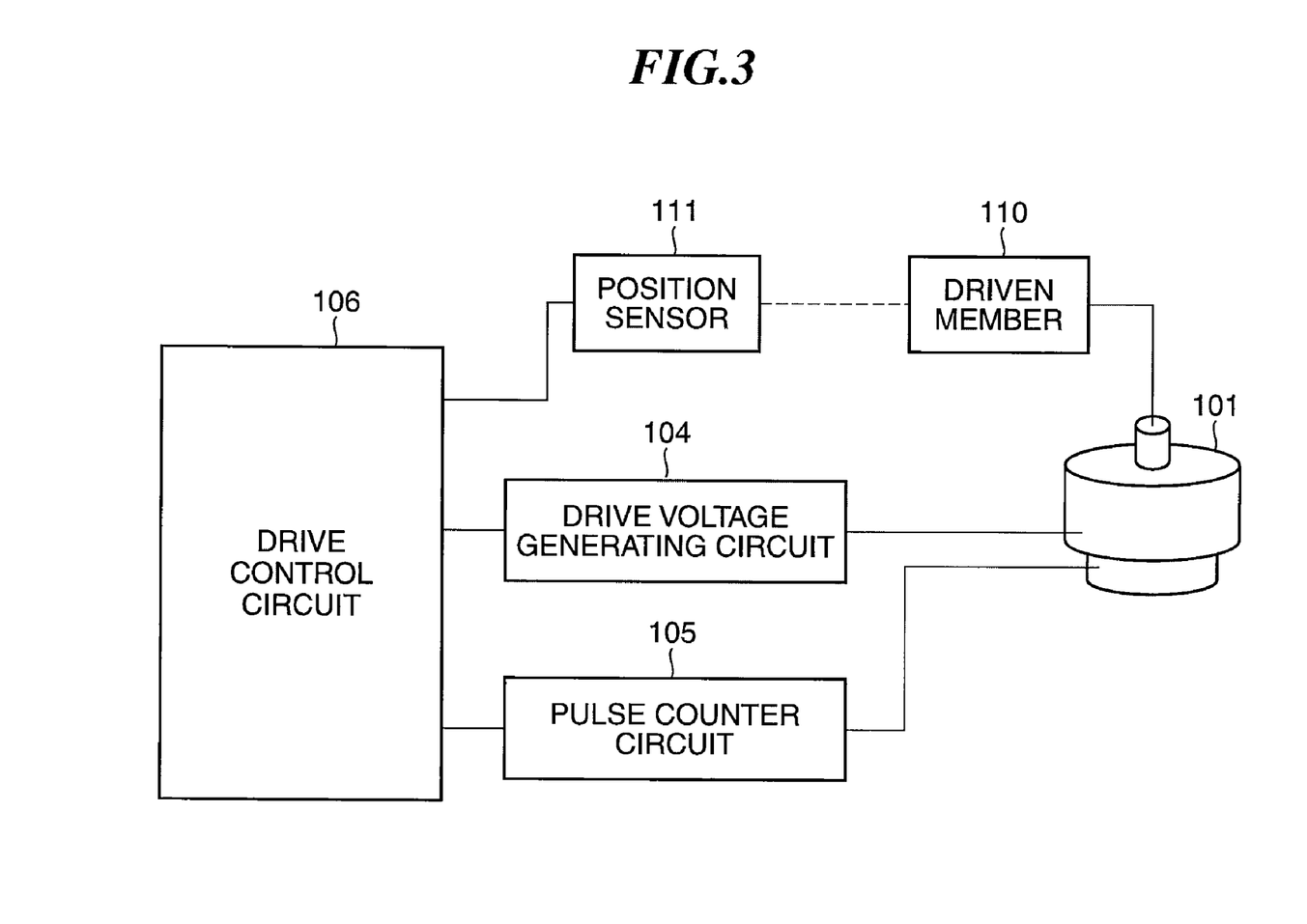
FIG. 3 is a schematic block diagram of a drive device for driving the vibration wave motor according to the embodiment of the present invention.

Next, a description will be given of a method of driving (controlling) the vibration wave motor 101. FIG. 3 is a schematic view of the drive device for driving the vibration wave motor according to the embodiment of the present invention. The drive device is comprised of a drive control circuit 106, a drive voltage generating circuit 104 for generating an AC voltage for driving the vibration wave motor 101 and the pulse counter circuit 105 for counting pulses of the pulse signal delivered from the encoder element 409 of the vibration wave motor 101.

The drive control circuit 106 delivers a frequency command signal for controlling the frequency of the AC voltage to the drive voltage generating circuit 104, as a drive signal (input signal) for the vibration wave motor 101. The drive voltage generating circuit 104 generates an AC voltage with a frequency dependent on the frequency command signal, and applies the AC voltage to the piezoelectric element 402 of the vibration wave motor 101.

As described above, the encoder element 409 of the vibration wave motor 101 generates a pulse signal corresponding to the rotation of the vibration wave motor 101 (rotation of the shaft 405 and the moving member 403). This pulse signal is input to the pulse counter circuit 105, converted to rotational speed information on the vibration wave motor 101 by the pulse counter circuit 105, and then sent to the drive control circuit 106. The drive control circuit 106 integrates the received rotational speed information to thereby determine the amount of the rotation (the amount of actuation) of the vibration wave motor 101.

The shaft 405 of the vibration wave motor 101 has a drive driven member 110 mounted thereon. The position of the driven member 110 is measured by a position sensor 111 (e.g. laser ranging sensor), and position information on the driven member 110 is input to the drive control circuit 106 in real time. The position sensor 111 may be integrally formed with the driven member 110. More specifically, the driven member 110 may be configured to have the function of detecting a position thereof and transmitting position information thereon to the drive control circuit 106. Information on a target position to which the driven member 110 is to be moved is input to the drive control circuit 106 via an input device, not shown.

There is a linear correlation between the rotation amount of the vibration wave motor 101 and the amount of movement of the driven member 110. In other words, when the movement amount of the driven member 110, required for causing the driven member 110 to move to a predetermined position, is determined, the rotation amount of the vibration wave motor 101, required for causing the driven member 110 to move to the predetermined position, is determined. Information for the conversion between the position of the driven member 110 and the rotation amount of the shaft 405 is stored in the drive control circuit 106.

Figure 4:
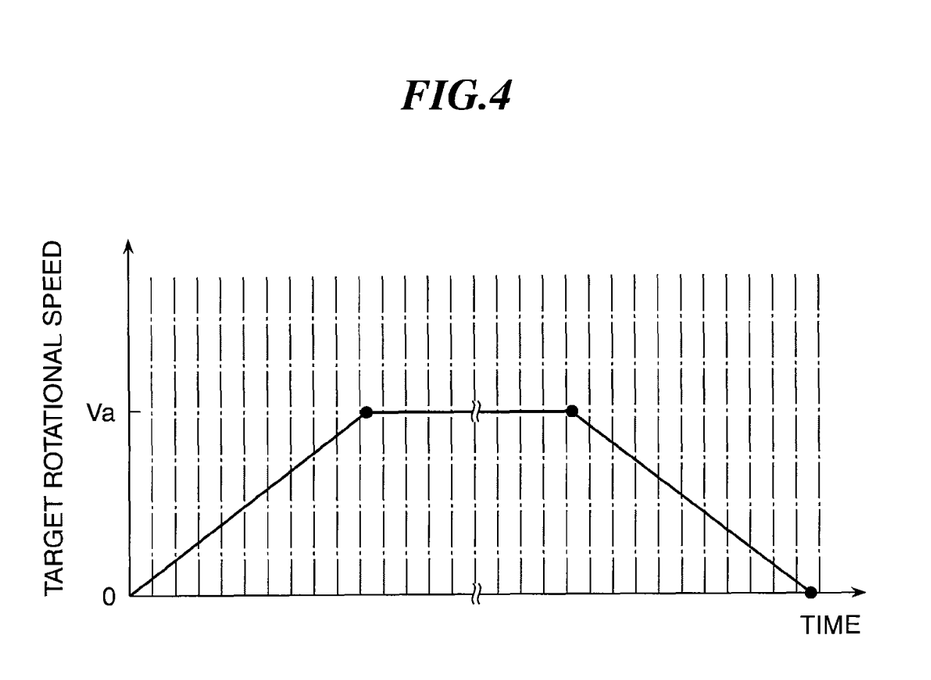
FIG. 4 is a graph showing time-series changes in a target rotational speed of the vibration wave motor.

FIG. 4 is a graph showing a time-series change in a target rotational speed of the vibration wave motor that is driven until a required amount of rotation is reached. When the target position of the driven member 110 is input to the drive control circuit 106, the drive control circuit 106 determines the difference between the target position of the driven member 110 and the current position thereof using the position information from the position sensor 111. The required rotation amount of the vibration wave motor 101 is determined based on the difference and the above-mentioned conversion information, and according to the rotation amount, the target rotational speed of the vibration wave motor 101 is set in time series. FIG. 4 shows a general speed pattern formed by an acceleration, a constant speed and a deceleration. The drive control circuit 106 changes (increases or decreases) the frequency of the AC voltage to control the rotational speed of the vibration wave motor 101 such that the target rotational speed is realized.

Each one-dot chain line shown in FIG. 4 indicates timing in which the drive control circuit 106 updates the target rotational speed. The drive control circuit 106 reads the target rotational speed at a predetermined repetition period, for updating the target rotational speed. More specifically, the drive control circuit 106 sequentially updates the target rotational speed of the vibration wave motor 101 as time elapses such that the target rotational speed is set in a manner tracing the graph shown in FIG. 4, though discretely.

Figure 5:
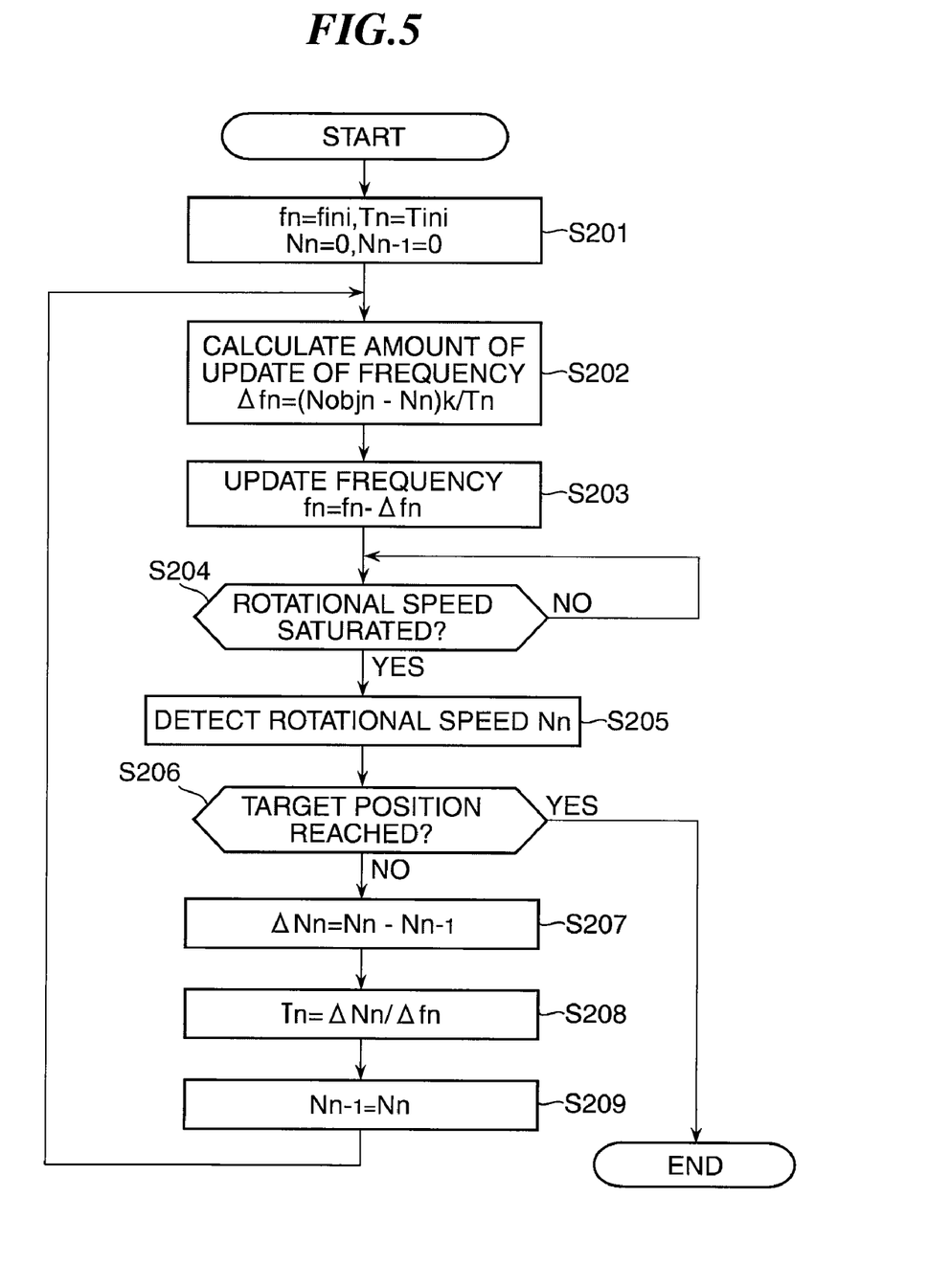
FIG. 5 is a flowchart of a speed control process executed by the drive device in FIG. 3, for controlling the rotational speed of the vibration wave motor.

FIG. 5 is a flowchart of a speed control process for controlling the rotational speed of the vibration wave motor. When the drive control circuit 106 receives a command for the target position of the driven member 110, the drive control circuit 106 generates a profile of the target rotational speed shown in FIG. 4, and then drives the vibration wave motor 101 by the speed control process shown in FIG. 5. The drive control circuit 106 is formed by hardware and software for executing the speed control process.

First, the drive control circuit 106 sets initial values of respective variables ($f_n$, $N_n$, $N_{n-1}$ and $T_n$) for use in the control (step S201).

The variable "f," represents the frequency command signal for controlling the frequency of the AC voltage for driving the vibration wave motor 101, and the initial value thereof is represented by "$f_{ini}$". Now, a frequency indicated by the frequency command signal fn is represented by "$f_n$". Accordingly, the amount of update of the frequency of the AC voltage for driving the vibration wave motor 101 is represented by the amount $\Delta f_n$ of update of the frequency command signal fn. The initial value $f_{ini}$ of the frequency command signal fn is set to a predetermined value sufficiently higher than a resonance frequency $f_r$ (see FIG. 6) of the vibration wave motor 101.

The variables "$N_n$" and "$N_{n-1}$" represent the rotational speed of the vibration wave motor 101, and initial values thereof are set to "0 (zero)". The variable "$T_n$" represents a ratio of an amount $\Delta N_n$ of increase or decrease in the rotational speed of the moving member 403 with respect to an amount $\Delta f_n$ of update of the frequency command signal fn ($=\Delta N_n/\Delta f_n$, hereinafter referred to as "the correction term $T_n$"), as will be described in detail hereinafter. The initial value of the correction term $T_n$ is represented by "$T_{ini}$".

After executing the step S201, the drive control circuit 106 calculates the amount $\Delta f_n$ of update of the frequency command signal fn by the following equation (1) [step S202 (frequency update amount-calculating step)]:

$$\Delta f_n = (N_{objn} - N_n) \cdot k / T_n \quad (1)$$

In the equation (1), the variable "$N_{objn}$" represents the target rotational speed of the vibration wave motor 101. When the vibration wave motor 101 starts to be drivingly controlled, the target rotational speed is periodically updated according to the graph shown in FIG. 4 with the lapse of time (setting step). "$N_{objn} - N_n$" represents a rotational speed difference between the target rotational speed and an actual rotational speed of the vibration wave motor 101. "k" represents a proportional gain and is a constant.

In the equation (1), by assuming that the rotational speed and the driving frequency of the AC voltage for driving the vibration wave motor 101 are proportional to each other, a provisional amount of update of the frequency command signal fn is determined using a linear function "$(N_{objn} - N_n) \cdot k$" of the rotational speed difference between the target rotational speed and the actual rotational speed. Now, as shown in FIG. 8, the slope of the amount of increase or decrease in the driving frequency with respect to the rotational speed difference varies depending on the rotational speed of the vibration wave motor 101, and hence there occurs a difference between the provisional amount of update of the frequency command signal fn and an actually required amount of update of the same. To reduce the difference, the provisional amount is divided by the correction term "$T_n$" obtained based on a nearby rotational speed, whereby the provisional amount is increased or decreased to make the provisional amount closer to the actually required amount. Immediately after the start of driving the vibration wave motor 101, the amount $\Delta f_n$ of update of the frequency command signal fn is calculated using the variables of which the initial values are set in the step S201.

After the step S202, the drive control circuit 106 updates the frequency command signal fn by subtracting the amount $\Delta f_n$ calculated in the step S202 from the already set value of the frequency command signal fn [step S203 (frequency updating step)].

In increasing the rotational speed of the vibration wave motor 101, the frequency ($f_n$) indicated by the frequency command signal fn is decreased, whereas in lowering the rotational speed, the frequency ($f_n$) indicated by the frequency command signal fn is increased. In response to the update of the frequency command signal fn, the drive voltage generating circuit 104 sweeps the frequency of the AC voltage, which is the input signal to the vibration wave motor 101, such that the frequency of the AC voltage reaches the frequency ($f_n$) indicated by the updated frequency command signal fn.

After the step S203, the drive control circuit 106 waits until the rotational speed of the vibration wave motor 101 is saturated [step S204 (waiting step)]. Here, "the rotational speed of the vibration wave motor 101 is saturated" is intended to mean that "the frequency of the AC voltage for driving the vibration wave motor 101 is swept until it reaches the frequency indicated by the frequency command signal fn, and the rotational speed of the vibration wave motor 101 becomes stable".

The drive control circuit 106 receives the rotational speed information on the vibration wave motor 101 from the pulse counter circuit 105. When the rotational speed of the vibration wave motor 101 is saturated (YES to the step S204), the drive control circuit 106 sets the rotational speed as the actual rotational speed $N_n$ of the vibration wave motor 101 [step S205 (speed detecting step)].

After the step S205, the drive control circuit 106 determines whether or not the driven member 110 has reached the target position thereof (step S206). If the driven member 110 has reached the target position (YES to the step S206), the present process is terminated (END).

On the other hand, if the driven member 110 has not reached the target position (NO to the step S206), the drive control circuit 106 calculates the amount $\Delta N_n$ ($=N_n - N_{n-1}$) of increase or decrease in the rotational speed (step S207). Now, the rotational speed $N_{n-1}$ represents the rotational speed of the vibration wave motor 101 detected immediately recently in the step S205 before detection of the rotational speed $N_n$.

Further, the drive control circuit 106 calculates the ratio $\Delta N_n/\Delta f_n$ of the amount $\Delta N_n$ of increase or decrease in the rotational speed, calculated in the step S207, to the amount $\Delta f_n$ of update of the frequency command signal fn, calculated in the step S202 [step S208 (ration calculating step)].

The ratio calculated in the step S208 is the correction term $T_n$, which is used for calculating the amount $\Delta f_n$ of update of the frequency command signal fn when the process returns to the step S202 again. Now, the correction term $T_n$ will be described with reference to FIG. 6.

FIG. 6 is a schematic diagram of the ratio of the amount of increase or decrease in the rotational speed of the vibration wave motor to the amount of update of the frequency command signal for use in driving the vibration wave motor. The amount $\Delta f_n$ of update of the frequency command signal fn calculated in the step S202 corresponds to the width of a very narrow frequency section (between $f_{n-1}$ and $f_n$) in the frequency-rotational speed characteristics shown in FIG. 6. Now, the variable "$f_{n-1}$" represents a frequency obtained when the rotational speed is equal to $N_{n-1}$. Since the amount $\Delta N_n$ of increase or decrease in the rotational speed represents the amount of change in the rotational speed in the very narrow frequency section (between $f_{n-1}$ and $f_n$), the correction term $T_n$ means the slope of the rotational speed in the very narrow frequency section, determined by a linear calculation.

After the step S208, the drive control circuit 106 updates the frequency command signal by replacing the value of the rotational speed $N_{n-1}$ by the value of the rotational speed $N_n$ (step S209), and then the process returns to the step S202 to continue the present control process.

Next, a detailed description will be given of the calculation using the equation (1) in the step S202.

As shown in FIG. 6, the frequency-rotational speed characteristics of the vibration wave motor 101 is non-linear. Therefore, even when the frequency-rotational speed characteristics are stored in the drive control circuit 106, it is not easy to determine the frequency command signal fn to be set for causing the rotational speed to reach the target rotational speed $N_{objn}$, from the rotational speed difference ($N_{objn}-N_n$) between the target rotational speed and the actual rotational speed.

Therefore, the drive control circuit 106 does not store the frequency-rotational speed characteristics shown in FIG. 6 but updates the frequency command signal fn using the value of a variable obtained during driving control of the vibration wave motor 101. That is, in the step S202, the drive control circuit 106 calculates the amount $\Delta f_n$ required for updating the frequency command signal fn in the step S203.

In the step S202, first, the drive control circuit 106 calculates a required amount of change in the rotational speed, that is, the rotational speed difference (=$N_{objn}-N_n$) between the target rotational speed $N_{objn}$ of the vibration wave motor 101 and the actual rotational speed $N_n$ thereof by a linear calculation (speed difference-calculating step). Then, the drive control circuit 106 calculates the amount $\Delta f_n$ of update of the frequency command signal fn by multiplying the calculated rotational speed difference $N_{objn}-N_n$ by the proportional gain k and dividing the product by the correction term $T_n$.

Actually, the value of the correction term $T_n$ (=$\Delta N_n/\Delta f_n$) used in the step S202 progressively changes according to the frequency command signal fn, as is apparent from FIG. 6. However, a change between respective values of the correction term $T_n$ in two adjacent very narrow frequency sections is small insofar as the width of each very narrow frequency section is not very wide. Therefore, in the step S202, the correction term $T_n$ calculated for a predetermined very narrow frequency section is used for calculation for the next very narrow frequency section. This makes it possible to properly calculate the amount $\Delta f_n$ of update of the frequency command signal fn.

Further, since the amount $\Delta f_n$ of update of the frequency command signal fn calculated in the step S202 determines the next very narrow frequency section, it is possible to properly calculate the value of the correction term $T_n$ in this section based on the amount $\Delta N_n$ of increase or decrease in the rotational speed and the amount $\Delta f_n$ of update of the frequency command signal fn in this section.

The proportional gain k is set to a proper value experimentally or empirically determined such that the vibration wave motor 101 is properly drivingly controlled, and depending on the case, the proportional gain k is not used. Further, a change in the correction term $T_n$ is smaller as the width of the very narrow frequency section is narrower, and hence, by making the width of the very narrow frequency section narrower, it is possible to reduce the error in the amount $\Delta f_n$ of update of the frequency command signal fn. To reduce the width of the very narrow frequency section, it is only required to narrow the distance between adjacent one-dot chain lines shown in FIG. 4, that is, the interval of time at which the drive control circuit 106 updates the target rotational speed. In the step S201, the initial value $T_{ini}$ of the correction term $T_n$ set is desirably set to a value as large as possible so as to prevent divergence of the rotational speed, whatever state the frequency-rotational speed characteristics may be in.

As described above, the amount $\Delta N_n$ of increase or decrease in the rotational speed, the amount $\Delta f_n$ of update of the frequency command signal fn and the correction term $T_n$ are repeatedly updated, whereby it is possible to properly control the frequency of an applied AC voltage according to an actual rotational speed of the vibration wave motor 101. At this time, there is no need to store the frequency-rotational speed characteristics in advance in the drive control circuit 106, which simplifies the circuit configuration of the vibration wave motor 101. Further, even if the frequency-rotational speed characteristics may vary due to a variation in load applied to the vibration wave motor 101, a variation in the temperature of the vibration wave motor 101 per se or of a temperature environment in which the vibration wave motor 101 is used, it is possible to control the frequency of the AC voltage in a manner following the characteristics.

Although a description has been given of an embodiment of the present invention, the present invention is by no means limited to the above-described embodiment.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-046268, filed Feb. 27, 2009, which is hereby incorporated by reference herein in its entirety.

What is claimed is:

1. A method of driving a vibration wave motor that drives a moving member in contact with a vibrating member by applying an AC voltage to an electromechanical energy conversion element affixed to the vibrating member and thereby causing the vibrating member to vibrate, comprising:
    setting a target rotational speed of the moving member;
    calculating a ratio of an amount of increase or decrease in a rotational speed of the moving member to an amount of update of a frequency of the AC voltage;
    calculating a rotational speed difference between the target rotational speed and an actual rotational speed of the moving member;
    calculating the amount of update of the frequency by dividing the calculated rotational speed difference by the calculated ratio; and
    updating the frequency of the AC voltage by using the calculated amount of update of the frequency.

2. The method according to claim 1, wherein said calculating of the amount of update of the frequency includes multiplying the calculated rotational speed difference by a constant.

3. The method according to claim 1, further comprising:
    waiting until the rotational speed of the moving member is saturated by the updated frequency; and
    detecting the saturated rotational speed of the moving member when the rotational speed of the moving member is saturated by said waiting,
    wherein said calculating of the ratio includes using a difference between values of the rotational speed of the moving member detected by said detecting of the rotational speed of the moving member when the rotational speed is saturated, at respective frequencies before and after updating the frequency, as the amount of increase or decrease in the rotational speed of the moving member.

4. A drive device for driving a vibration wave motor that drives a moving member in contact with a vibrating member by applying an AC voltage to an electromechanical energy conversion element affixed to the vibrating member and thereby causing the vibrating member to vibrate, comprising:

a drive control circuit that sets a target rotational speed of the moving member, calculates a ratio of an amount of increase or decrease in a rotational speed of the moving member to an amount of update of a frequency of the AC voltage, calculates a rotational speed difference between the target rotational speed and an actual rotational speed of the moving member, calculates the amount of update of the frequency by dividing the calculated rotational speed difference by the calculated ratio, and updates the frequency of the AC voltage by using the calculated amount of update of the frequency.

* * * * *